(12) United States Patent
Nory et al.

(10) Patent No.: US 8,140,102 B2
(45) Date of Patent: Mar. 20, 2012

(54) METHOD AND APPARATUS FOR TRANSMIT POWER CALIBRATION IN A FREQUENCY DIVISION MULTIPLEXED WIRELESS SYSTEM

(75) Inventors: Ravikiran Nory, Grayslake, IL (US); Edgar Fernandes, Winchester (GB); Robert Love, Barrington, IL (US); Vijay Nangia, Algonquin, IL (US); Dale Schwent, Schaumburg, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 959 days.

(21) Appl. No.: 11/838,517

(22) Filed: Aug. 14, 2007

(65) Prior Publication Data

US 2009/0046693 A1    Feb. 19, 2009

(51) Int. Cl.
*H04B 7/00* (2006.01)
*H04B 7/185* (2006.01)
*H04W 24/00* (2009.01)
*H04W 4/00* (2009.01)
*H04J 1/00* (2006.01)
*H04K 1/10* (2006.01)

(52) U.S. Cl. ........ 455/522; 455/423; 370/318; 370/332; 370/343; 375/260

(58) Field of Classification Search .................. 455/522, 455/423; 370/343; 375/260
See application file for complete search history.

(56) References Cited

U.S. PATENT DOCUMENTS

| 5,287,555 | A | 2/1994 | Wilson et al. |
| 6,594,251 | B1 | 7/2003 | Raissinia et al. |
| 6,788,950 | B1 | 9/2004 | Raissinia et al. |
| 2003/0002452 | A1 | 1/2003 | Sahota |
| 2005/0014524 | A1 | 1/2005 | Lott et al. |
| 2006/0120404 | A1 | 6/2006 | Sebire et al. |
| 2007/0058605 | A1 | 3/2007 | Meylan et al. |

FOREIGN PATENT DOCUMENTS

| EP | 1566887 A2 | 8/2005 |
| WO | 2006134945 A1 | 12/2006 |
| WO | 2007052972 A | 5/2007 |

(Continued)

OTHER PUBLICATIONS

Notification Concerning Transmitial of International Preliminary Report on Patentability (Chapter 1 of the Patent Cooperation Treaty); dated Feb. 25, 2010; Issued in Related PCT Application PCT/US2008/073037.

(Continued)

*Primary Examiner* — Marivelisse Santiago-Cordero
*Assistant Examiner* — Omoniyi A Obayanju
(74) *Attorney, Agent, or Firm* — Matthew C. Loppnow; Roland K. Bowler, II

(57) ABSTRACT

The present disclosure describes a method and apparatus for transmit power calibration in a frequency division multiplexed wireless system (100). The method may include receiving (320), at a user equipment (120), a signal from a base station (130) in a frequency division multiplexed wireless system and mapping (330), in response to receiving the signal from the base station, a power control calibration region to an uplink symbol in a subframe to establish a mapped uplink symbol using predetermined criteria. The method can also include calibrating (350) a transmit power based on transmission in the calibration region and transmitting (360) data at the calibrated transmit power on at least one other symbol following the mapped uplink symbol.

20 Claims, 7 Drawing Sheets

FOREIGN PATENT DOCUMENTS

WO  WO 2007052972 A1 * 5/2007

OTHER PUBLICATIONS

3rd Generation Partnership Project (3GPP): "Intra-cell Transmission Power Control Scheme in EUTRA Uplink"; R1-072944; Mobile Competence Centre; 650, Route Des Lucioles ; F-06921 Sophia-Antipolis Cedex; France, Jun. 20, 2007.

3rd Generation Partnership Project; Technical Specification Group Radio Access Network; Physical layer Aspects for Evolved Universal Terrestrial Radio Access (UTRA) (Release 7) Internet Citation, Sep. 2006.

Motorola; UE Transmit Power Accuracy & Calibration; 3GPP TSG RAN1#50; Athens Greece; Aug. 20-24, 2007; R1-07xxxx.

Motorola; Effect of UE transmit power adjustments on EUTRA UL; 3GPP TSG RAN1 #50; Athens Greece; Aug. 20-29, 2007; R1-07xxxx.

3GPP TSG-RAN WG1 #49-bis; Source: CATT, Ericsson, LGE, Motorola, Nokia, Nokia-Siemens, Nortel, NTT DoCoMo, Orange, Panasonic, Philips, Qualcomm, Samsung, Sharp, TI, Vodafone; Way Forward on Power Control of PUSCH; Orlando, FL USA; Jun. 25-29, 2007; R1-073224.

3GPP TSG RAN WG1; #49 bis; Source: Nokia Siemens Networks, Nokia; Orlando, FL, USA Jun. 25-29, 2007; R1-072988.

3GPP TSG RAN WG1 #48bis, R1-071463 "Uplink Power Control Proposal for E-UTRA with Overhead Analysis" Interdigital Communications Corporation, St. Juliens, Malta, Mar. 26-30, 2007, 10 pages.

3GPP TSG RAN WG1 #49bis, R1-072781 "E-UTRA Uplink Power Control Proposal and Evaluation" Interdigital Communications Corporation, Orlando, USA, Jun. 25-29, 2007, 14 pages.

3GPP TSG RAN WG1 #48bis, R1-071694 "Uplink Power Control" Siemens, Nokia, St. Juliens, Malta, Mar. 26-30, 2007, 6 pages.

3GPP TSG RAN WG1 #48bis, R1-072675 "Uplink Power Control: Details" Motorola, Orlando, USA, Jun. 25-29, 2007, 4 pages.

Patent Cooperation Treaty, "PCT Search Report and Written Opinion of the International Searching Authority" for International Application No. PCT/US2008/073042 (CS34183) Feb. 12, 2009, 16 pages.

* cited by examiner

METHOD AND APPARATUS FOR TRANSMIT POWER CALIBRATION IN A FREQUENCY DIVISION MULTIPLEXED WIRELESS SYSTEM

CROSS-REFERENCE TO RELATED APPLICATIONS

This application is related to application entitled "Method and Apparatus for Transmit Power Calibration in a Frequency Division Multiplexed Wireless System," case number 041-0086, filed on even date herewith and commonly assigned to the assignee of the present application, which is hereby incorporated by reference.

BACKGROUND

1. Field

The present disclosure is directed to a method and apparatus for transmit power calibration in a frequency division multiplexed wireless system. More particularly, the present disclosure is directed to mapping a power control calibration region to an uplink symbol in a subframe.

2. Introduction

Presently, efforts are currently underway to standardize uplink power control for Third Generation Partnership Project (3GPP) Long Term Evolution (LTE), also referred to as Evolved Universal Terrestrial Radio Access (EUTRA). While exact implementation details are yet to be finalized, it is generally understood that terminals, such as user equipment (UE), in a EUTRA network will have to transmit at a certain power level that is determined by a specific power control formula. It is also generally understood that, for each UE, the power control formula attempts to maintain the per subcarrier power, such as power spectral density (PSD) received at the base station at a desired level. If the received PSD has to be kept at a particular level, and the number of subcarriers allocated to a UE is significantly different in each subframe, then total transmit power of each EUTRA UE will change considerably from subframe to subframe. Maintaining transmit power accuracy, with rapidly changing transmission bandwidth and transmission frequency, such as separate sets of subcarriers that may be allocated in different subframes, will be a significant challenge for UE hardware implementation. Without any mitigation mechanisms in place, UEs in the EUTRA network will make significant errors in the transmit power resulting in a considerable loss in spectral efficiency.

Thus, there is a need for a method and apparatus for transmit power calibration in a frequency division multiplexed wireless system.

SUMMARY

The present disclosure describes a method and apparatus for transmit power calibration in a frequency division multiplexed wireless system. The method may include receiving, at a user equipment, a signal from a base station in a frequency division multiplexed wireless system and mapping, in response to receiving the signal from the base station, a power control calibration region to an uplink symbol in a subframe to establish a mapped uplink symbol using predetermined criteria. The method can also include calibrating a transmit power based on transmission in the calibration region and transmitting data at the calibrated transmit power on at least one other symbol following the mapped uplink symbol.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
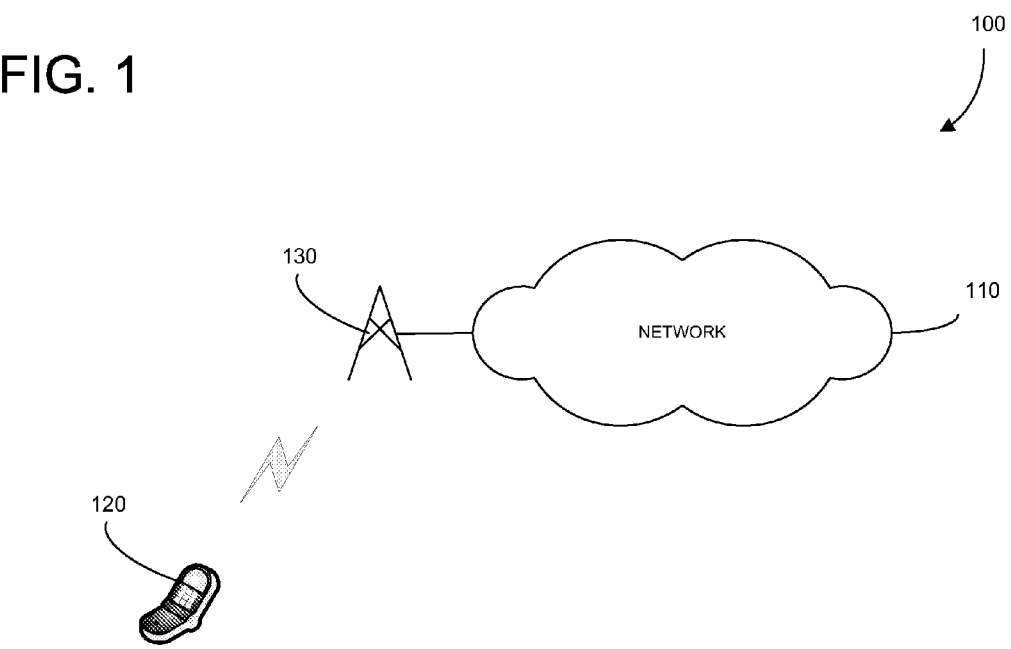
FIG. 1 illustrates an exemplary diagram of a system in accordance with one possible embodiment of the disclosure.

FIG. 1 is an exemplary diagram of a system 100 according to one embodiment. The system 100 can include a network 110, a terminal 120, and a base station 130. The terminal 120 may be an apparatus such as a wireless communication device, a user equipment, wireless telephone, a cellular telephone, a personal digital assistant, a pager, a personal computer, a selective call receiver, or any other device that is capable of sending and receiving communication signals on a network including wireless network.

The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a satellite communications network, and other like communications systems. For example, the network 110 can be a frequency division multiplexed wireless system. The frequency division multiplexed wireless system can use subframes comprising a plurality of symbols where multiple users of terminals can transmit in a single subframe at different frequencies. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the terminal 120 can receive signals from the base station 130 as well as perform measurements to determine desired transmission power level. The terminal 120 can map, or associate, a power control calibration region and an uplink symbol in a subframe based on a signal from the base station 130 to allocate a mapped uplink symbol for power control calibration. The terminal 120 can then perform a calibration transmission using a power calibration waveform within the mapped uplink symbol at an initial transmit power. The terminal 120 can then measure the initial transmit power of the calibration transmission and generate a calibrated transmit power. These steps represent closed loop feedback in the terminal transmitter. The calibrated transmit power will then be closer to the desired transmission power level than the initial transmit power. The terminal 120 can then adjust a transmission power level based on the calibrated transmit power. The terminal 120 can then transmit data at the adjusted transmit power on at least one other symbol immediately following the mapped uplink symbol.

For example, in an Evolved Universal Terrestrial Radio Access (EUTRA) network, a Worldwide Interoperability for Microwave Access (WiMAX) network, or any other frequency division multiplexed wireless system, if a terminal's transmit power (P) for a current subframe is significantly different, such as greater than 1 dB, from the previous subframe (P_prev), the disclosed methods can be used to improve system performance.

According to a related embodiment, the terminal 120 can use a reserved time interval in the scheduled uplink allocation of a first symbol in a subframe for transmit power calibration. The reserved time interval can span the entire first symbol or a portion of it. Calibration can be performed by transmitting a specific transmit power calibration waveform. After internal calibration, data and reference signals can be transmitted for the reminder of the subframe at a power level closer to desired level (P). In order to reduce the loss in overall system capacity, the terminal 120 can perform the calibration only when required. For example, the terminal 120 may only perform the calibration if the difference between the desired transmit power and the actual transmit power exceeds a power change threshold (P−P_prev>X dB). The XdB threshold may for example be 1 dB and can be predetermined in advance or can be set using signalling between the terminal 120 and the base station 130.

The base station 130 may need to know whether the terminal 120 is stealing the first symbol for power calibration. In one embodiment, the base station 130 can use a specific bit in the uplink scheduling grant to explicitly instruct the terminal 120 to steal the first symbol in the uplink subframe for calibration. In an alternate embodiment the terminal 120 and the base station 130 can use some form of implicit understanding. The power change threshold (XdB) can be one example. Alternately the base station 130 and the terminal 120 can agree based on the terminal hardware capability, a terminal transmit power threshold (YdBm) below which calibration is not performed. YdBm for example can be 0 dBm and can be predetermined in advance or be based on signaling between the base station 130 and the terminal 120. that prompts the terminal 120 to steal the first symbol can be specified. The terminal 120 can compare its current uplink grant with the previous grant and determine if the required power change to obey the current grant is greater than the threshold X. If yes, the terminal 120 can steal the first symbol for calibration. A scheduler in the base station 130 can use the same calculation as the terminal to predict that the terminal will steal the first symbol and account for reduced resources caused due to calibration by appropriately adjusting the Modulation and Coding Scheme (MCS) allocation for the terminal 120. This alternate embodiment may be most effective in scenarios where the terminal's transmit power change is caused by changes in the scheduling grant, such as a change in a number of allocated subcarriers, a change in MCS level, an explicit power control correction in the grant, or the like. If the terminal 120 has to change its transmit power to compensate for a change in path loss, it might not use the first symbol for calibration because the power control formula can be implemented in the terminal 120. Thus, the terminal will not steal the symbol for calibration where the circumstances suggest that the base station 130 is not simultaneously aware of path loss changes and therefore may not account for the stolen calibration symbol.

If the terminal 120 has to wake up and transmit in the current subframe (i.e., it was not transmitting during the previous subframe duration) then, instead of using the entire first symbol for calibration, it can wake up early and use a portion of the previous subframe for transmitting the calibration waveform. If the terminal 120 receives a grant comprising multiple subframes, implicit or explicit messaging between the terminal 120 and the base station 130 may make sure that calibration is done only once at the beginning of the multi-subframe grant. If the calibration time can be reduced by increasing the terminal complexity then one symbol can be split into two half symbols such that one half of the symbol can be used for power control calibration and the other half can be used for sound reference symbol or for data transmissions.

According to a related embodiment, the power calibration region can be a reserved time-frequency region, such as the middle 24 sub-carriers within a particular symbol in a subframe, which can be used by all terminals that need to make transmit power calibration. A terminal 120 desiring to perform power calibration can use the reserved time-frequency region irrespective of the terminal's resource allocation provided by, for example, a Physical Downlink Control Channel (PDCCH) Uplink (UL) grant message or also known as the uplink scheduling grant. The remaining sub-carriers of the first symbol, such as a Single Carrier Frequency Division Multiple Access (SC-FDMA) symbol, can be used for data/reference signal transmission by terminals that do not need to do power calibration, thus reducing the effective calibration overhead. The data/reference signal transmission can be within resource blocks allocated to the terminal 120 in the sub-frame by the UL grant or over a different region such as might be the case for a sounding reference symbol (SRS) transmission.

As the transmit power accuracy can be less sensitive to allocation bandwidth and allocation location in frequency, such as by some pre-determined calibration, the transmit power calibration on a reserved time-frequency region, rather than on the sub-carriers assigned to the terminal 120, can give good performance.

The number of subcarriers used in the calibration region can be the same or different for different bandwidth (BW) modes, such as 1.4, 3, 5, 10, and/or 20 MHz BW modes. Further, the number of subcarriers can be cell/base station/system-specific with appropriate signaling on a broadcast channel (BCH). The location of the time-frequency calibration region can be fixed or change, such as hop, between subframes/radio-frames/super-frame based on a hopping pattern. The hopping pattern can be the same for all cells/base stations in the system or can be cell/base station specific. Hopping of the calibration region may be beneficial to further fine tune the power settings for different portions of the system bandwidth.

The terminal 120 can save the hardware settings obtained after the power calibration process and use it for subsequent transmission with similar transmission power requirements such as the case for retransmissions in non-adaptive Hybrid Automatic Request (HARQ) operation. Terminals performing power calibration can rate match or puncture the transmit data symbols corresponding to the calibration duration. The punctured data symbols may be transmitted on subsequent retransmissions, which do not require power calibration. Terminals allocated resource blocks overlapping with the calibration region can rate match/puncture to take in to account the loss in resources due to the calibration region even if they do not need to perform power calibration.

According to some embodiments, the signal transmitted during the power calibration can be a known signal pattern that is terminal/cell/base station specific, which may be used by the base station for various purposes, such as approximately estimating terminal channel quality, received power, terminal power/calibration error, or the like by comparing the received signal during calibration and after calibration. Subsequent information from demodulation reference symbols (DRS) from the following packet transmission or a subsequent sounding reference symbol (SRS) can be used in conjunction with any information generated from the calibration waveform. Some sounding overhead can be reduced since fewer SRS need to be reserved. If the entire bandwidth is sounded in one SRS then it is possible that only the power control calibration symbol is needed to perform sounding. Also, the terminal 120 is able to shut off its transceiver between transmitting the calibration signal and transmitting at the calibrated power. The calibrated transmission does not need to immediately follow the calibration signal.

Further, the calibration signal that can be used for various embodiments can be at constant amplitude or near constant amplitude. Sequences used for creating the calibration waveform can be from a known or an unknown waveform. Examples of known waveform include a tone, a Generalized Chirp Like (GCL) or Zadoff-Chu sequence based waveform with possible truncation or cyclic extension, reference signals (pilots) used by the terminal 120 for the calibration waveform bandwidth or a portion thereof. Examples for unknown waveform include Quadrature Phase Shift Keying (QPSK) modulated Single Carrier Frequency Division Multiple Access (SC-FDMA) signal and/or Discrete Fourier Transform Spread (DFT-Spread) QPSK modulated signal. For a terminal 120 assigned 16-Quadrature Amplitude Modulated (16-QAM) modulation for data transmission, the QPSK calibration waveform can correspond to bits pairs b(n), b(n+1) (input of QPSK modulation mapper) of the 16-QAM quadruplets of bits, b(n), b(n+1), b(n+2), b(n+3) that would be transmitted instead of the calibration waveform. Thus, bits b(n+2) b(n+3) are effectively punctured. The bit pair b(n) b(n+1) can correspond to the 16-QAM quadrant selector bits which selects the In phase-Quadrature phase (I-Q) quadrant. Similarly, for a terminal 120 assigned 64-Quadrature Amplitude Modulated (64-QAM) modulation, the QPSK calibration waveform can correspond to bits pairs b(n), b(n+1) (input of QPSK modulation mapper) of the 64-QAM hextuplets of bits, b(n), b(n+1), b(n+2), b(n+3), b(n+4), b(n+5) that would be transmitted instead of the calibration waveform. Thus, bits b(n+2) b(n+3) b(n+4), b(n+5) are effectively punctured. The bit pair b(n) b(n+1) can correspond to the 64-QAM quadrant selector bits which selects the I-Q quadrant.

The calibration region can include one or more guard (unused) subcarriers on one or both edges of the calibration region. This may be to reduce interference on sub-carriers adjacent to the calibration region due to possible power transients by power calibrating terminals in the calibration region. The number of guard sub-carriers may be different on either edge of the calibration region.

Figure 2:
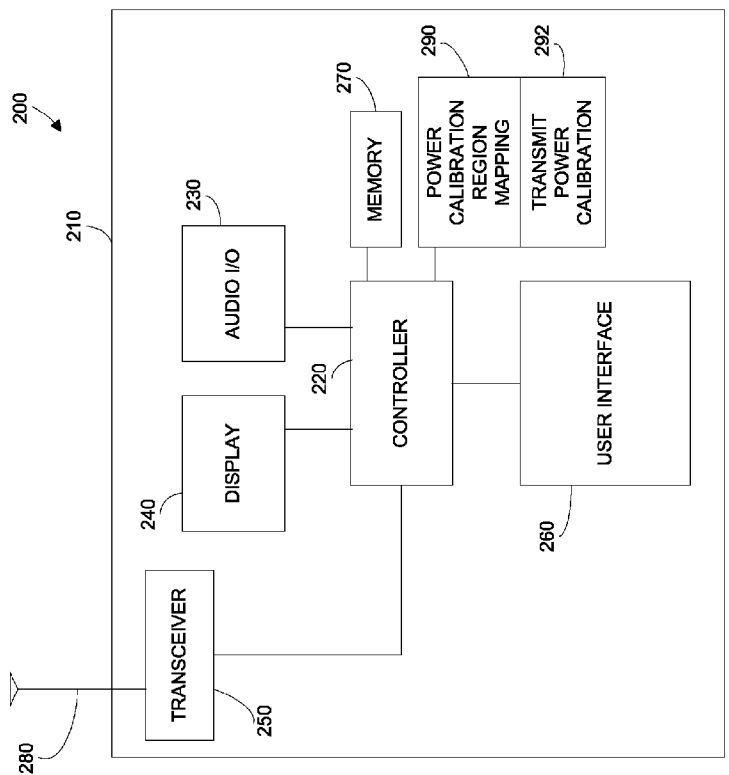
FIG. 2 illustrates an exemplary block diagram of a wireless communication device in accordance with one possible embodiment of the disclosure.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a power calibration region mapping module 290 and a transmit power calibration module 292. The power calibration region mapping module 290 and the transmit power calibration module 292 can be coupled to the controller 220, can reside within the controller 220, can reside within the memory 270, can be autonomous modules, can be software, can be hardware, or can be in any other format useful for a module on a wireless communication device 200. The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can control the operations of the wireless communication device 200. The transceiver 250 can transmit to and receive data from a base station or other communication device opreable in a frequency division multiplexed wireless system. The power calibration region mapping module 290 maps a power control calibration region to an uplink symbol in a subframe to establish a mapped uplink symbol based on predetermined criteria corresponding to the signal. The power control calibration region is a time frequency location in the mapped uplink symbol and is used for transmitting a calibration waveform. The power calibration mapping module 290 can also map a power control calibration region to an uplink symbol in a subframe using predetermined criteria corresponding to the signal, where the power control calibration region can have a bandwidth less than a frequency allocation in the signal. The transceiver 250 can then perform a calibration transmission during the mapped uplink symbol. The transmit power calibration module 292 can calibrate a transmit power based on the calibration transmission. The transceiver 250 can then transmit data at the calibrated transmit power on at least one other symbol following the mapped uplink symbol.

A frequency domain location of the mapped power control calibration region can fall within a scheduled frequency resource allocation bandwidth for the wireless communication device 200. A frequency domain location of the mapped power control calibration region can also fall within a common frequency resource allocation bandwidth.

The transceiver 250 can transmit data at the calibrated transmit power, after performing the calibration transmission, on at least one other symbol following the mapped uplink symbol. The one other symbol can be contained within a same subframe as the mapped uplink symbol. The one other symbol can also be contained within an immediate subsequent subframe from the mapped uplink symbol. The one other symbol can immediately follow the mapped uplink symbol.

Figure 3:
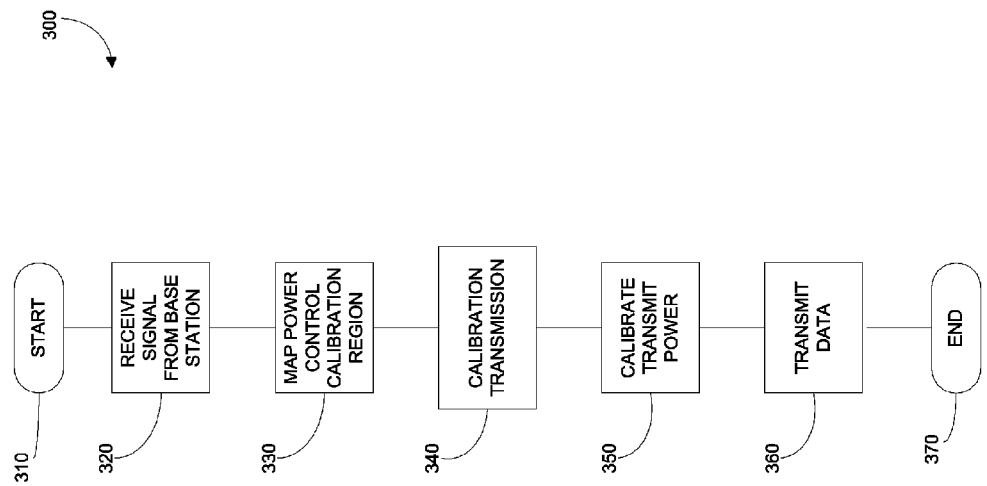
FIG. 3 is an exemplary flowchart illustrating the operation of a wireless communication device in accordance with one possible embodiment of the disclosure.

FIG. 3 is an exemplary flowchart 300 illustrating the operation of the wireless communication device 200 according to another embodiment. In step 310, the flowchart begins. In step 320, the wireless communication device 200 can receive a signal from a base station in a frequency division multiplexed wireless system. The signal from the base station can include system broadcast information and/or an uplink scheduling grant.

In step 330, the wireless communication device 200 can map, in response to receiving the signal from the base station, a power control calibration region to an uplink symbol in a subframe to establish a mapped uplink symbol using predetermined criteria. A frequency domain location of the mapped power control calibration region can fall within a scheduled frequency resource allocation bandwidth for the wireless communication device 200. A frequency domain location of the mapped power control calibration region can alternatively fall within a common frequency resource allocation bandwidth, a common frequency resource allocation bandwidth being one shared by multiple terminals. The predetermined criteria can be responsive to the signal from the base station and can result in a variable or preset location for the power control calibration region. The predetermined criteria can alternatively be modified by the signal from the base station. The signal from the base station can include system broadcast information and/or the uplink scheduling grant. The predetermined criteria can include the time frequency calibration region in which the calibration is to be performed. The power control calibration region can have a bandwidth less than the scheduled frequency resource allocation bandwidth for the wireless communication device 200. Alternatively, the power control calibration region can have a bandwidth less than the carrier bandwidth which is defined as the occupied bandwidth plus any guard bands. For E-UTRA the carrier bandwidth for each bandwidth mode is 1.4, 3, 5, 10, 15, and 20 MHz. The allowed occupied bandwidth is determined by the maximum number of subcarriers available for allocation to terminals for a given symbol or subframe and does not include any guard bands. For example, for a carrier bandwidth of 5 MHz the allowed occupied bandwidth may be composed of 300 subcarriers with subcarrier separation of 15 kHz such that the occupied bandwidth would be 4.5 MHz. It would be slightly larger if there was an extra DC subcarrier such that the allowed occupied bandwidth would then be 301 subcarriers. The power control calibration region can also have bandwidth less than the allowed occupied bandwidth of the carrier.

In step 340, the wireless communication device 200 can perform a calibration transmission during the mapped uplink symbol for performing transmit power control calibration. In step 350, the wireless communication device 200 can calibrate a transmit power based on the calibration transmission. In step 360, the wireless communication device 200 can transmit data at the calibrated transmit power on at least one other symbol following the mapped uplink symbol. The one other symbol can be contained within a same subframe as the mapped uplink symbol. The one other symbol can be contained within an immediate subsequent subframe from the mapped uplink symbol. Data transmitted can include a user data transmission, a demodulation reference symbol transmission, a sounding reference symbol transmission, or the like. The wireless communication device 200 can transmit data by transmitting data at the calibrated transmit power, after performing the calibration transmission, on at least one other symbol immediately following the mapped uplink symbol. In step 370, the flowchart 300 ends.

Figure 4:
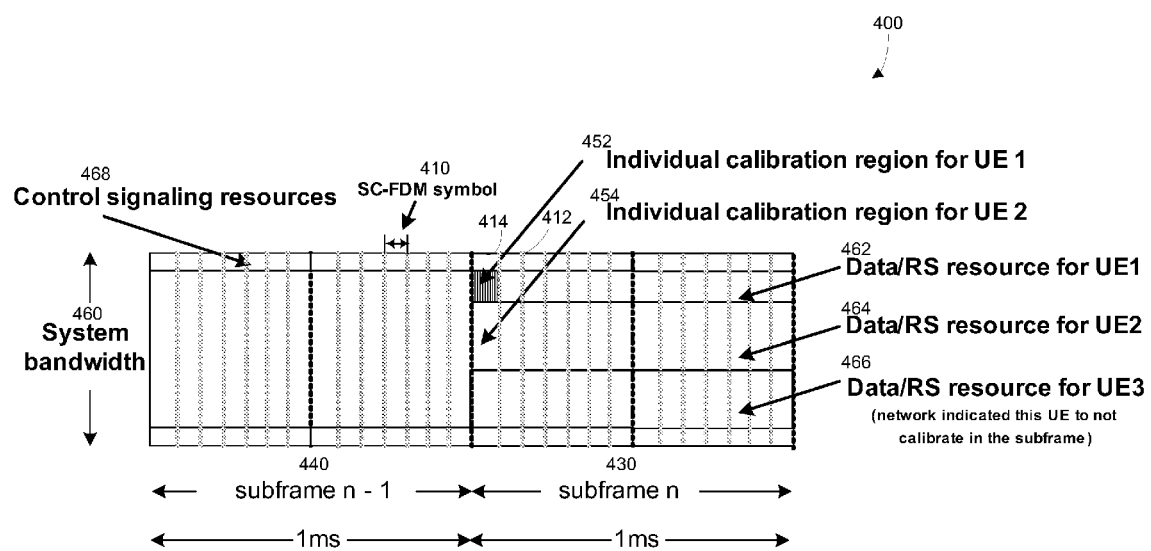
FIG. 4 is an exemplary illustration of a scenario for a terminal calibration region in a same subframe in accordance with one possible embodiment of the disclosure.

FIG. 4 is an exemplary illustration of a scenario 400 for a terminal calibration region in a same subframe. The scenario shows system bandwidth 460 allocated for different terminals UE1 462, UE2 464, and UE3 466. Bandwidth 460 can also be allocated for control signaling resources 468. The time period can be broken into subframes 430 and 440. Each subframe can include a plurality of single carrier frequency division multiplexed (SC-FDM) symbols 410.

In operation, a terminal 120, such as UE1, can transmit data at a calibrated transmit power on at least one other symbol 412 following a mapped uplink symbol 414 where the one other symbol 412 is contained within a same subframe 430 as the mapped uplink symbol 414. Thus, resources within the first symbol 414 of the UE1s allocated subframe can be used for calibration 452 and resources within the first symbol 414 of the UE2s allocated subframe can be used for calibration 454. The base station 130 can indicate to the UE1 whether to calibrate or not either explicitly, for example, using one bit on an uplink signaling grant, or implicitly based on certain rules.

Figure 5:
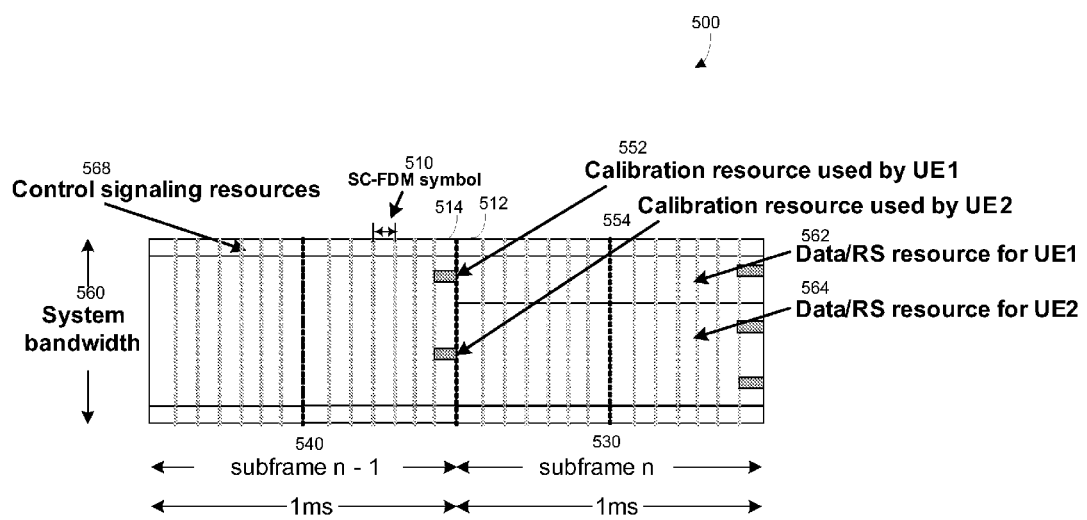
FIG. 5 is an exemplary illustration of a scenario for a terminal calibration region in a previous subframe in accordance with one possible embodiment of the disclosure.

FIG. 5 is an exemplary illustration of a scenario 500 for a terminal calibration region in a previous subframe. The scenario shows system bandwidth 560 allocated for different terminals UE1 562 and UE2 564. Bandwidth 560 can also be allocated for control signaling resources 568. The time period can be broken into subframes 530 and 540. Each subframe can include a plurality of SC-FDM symbols 510.

In operation, a terminal 120, such as UE1, can transmit data at a calibrated transmit power on at least one other symbol 512 following a mapped uplink symbol 514 where the one other symbol 512 can be contained within a subsequent subframe 530 from subframe 540 of the mapped uplink symbol 514. Thus, resources within the last symbol 514 of a previous subframe 540 can be used for UE1 calibration 552 and resources within the last symbol 514 of a previous subframe 540 can be used for UE2 calibration 554. Other subcarriers in the last symbol of the previous subframe n−1 540 can be used for data or sounding reference symbol (SRS) transmission. Since only a very small fraction of resources in the previous subframe 540 are used for calibration, loss at the base station 130 receiver due to interference caused by the calibrating terminals can be small. If the base station 130 has information about what calibration resources are used, it can use the information for more efficient signal processing. Therefore, the terminal 120 can transmit data at the calibrated transmit power on at least one other symbol 512 following the mapped uplink symbol 514 where the one other symbol 512 can be contained within an immediate subsequent subframe from the mapped uplink symbol 514.

Figure 6:
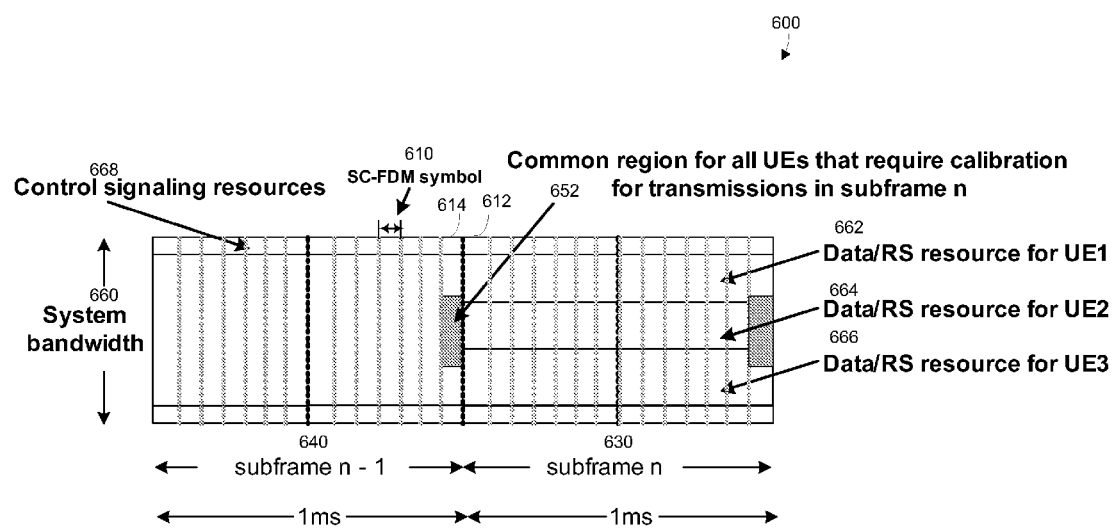
FIG. 6 is an exemplary illustration of a scenario for a shared calibration region in a previous subframe in accordance with one possible embodiment of the disclosure.

FIG. 6 is an exemplary illustration of a scenario 600 for a shared calibration region 652 in a previous subframe. The scenario shows system bandwidth 660 allocated for different terminals UE1 662, UE2 664, and UE3 666. Bandwidth 660 can also be allocated for control signaling resources 668. The time period can be broken into subframes 630 and 640. Each subframe can include a plurality of SC-FDM symbols 610.

In operation, a terminal 120, such as UE1, can transmit data at a calibrated transmit power on at least one other symbol 612 following a mapped uplink symbol 614 where the one other symbol 612 can be contained within a subsequent subframe 630 from subframe 640 of the mapped uplink symbol 614. Thus, all UEs that are scheduled for transmission in subframe n 630 and that need calibration can use a common region 652 in the last symbol 614 of the previous subframe n−1 640 for calibration. Remaining resources in the last symbol 614 of the previous subframe 640 can be used for data or SRS transmissions. The shared calibration region 652 may hop in frequency over consecutive subframes 640 and 630 according to a predefined pattern. Therefore, a band frequency domain location of the mapped power control calibration 652 region can fall within a common frequency resource allocation bandwidth.

Figure 7:
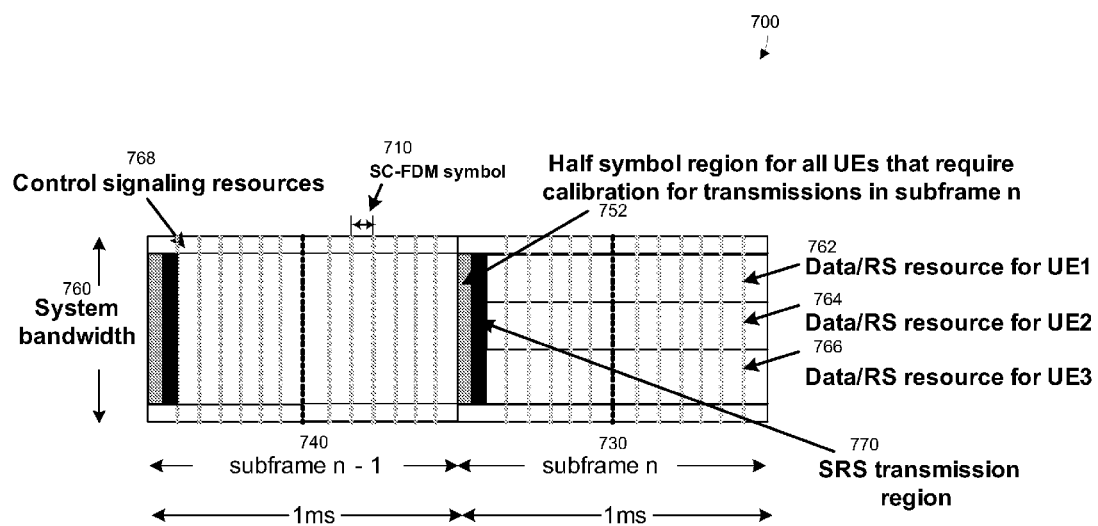
FIG. 7 is an exemplary illustration of a scenario for a terminal calibration region using two half symbols in accordance with one possible embodiment of the disclosure.

FIG. 7 is an exemplary illustration of a scenario 700 for a terminal calibration region using two half symbols 752 and 770. The scenario shows system bandwidth 760 allocated for different terminals UE1 762, UE2 764, and UE3 766. Bandwidth 760 can also be allocated for control signaling resources 768. The time period can be broken into subframes 730 and 740. Each subframe can include a plurality of SC-FDM symbols 710.

In operation, a terminal 120, such as UE1, can transmit data at a calibrated transmit power on at least one other half symbol 770 following a mapped uplink symbol 752. The data may be a SRS transmission. All UEs needing calibration for data or SRS can transmit on first half symbol 752.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
    receiving, at a user equipment, a signal from a base station in a frequency division multiplexed wireless system;
    mapping, in response to receiving the signal from the base station, a power control calibration region to an uplink symbol in a subframe to establish a mapped uplink symbol using predetermined criteria;
    calibrating a transmit power based on transmission in the calibration region; and
    transmitting data at the calibrated transmit power on at least one other symbol following the mapped uplink symbol.

2. The method according to claim 1, wherein a frequency domain location of the mapped power control calibration region falls within a scheduled frequency resource allocation bandwidth for the user equipment.

3. The method according to claim 1, wherein transmitting data at the calibrated transmit power comprises transmitting data at the calibrated transmit power on at least one other symbol following the mapped uplink symbol, the one other symbol contained within a same subframe as the mapped uplink symbol.

4. The method according to claim 1, wherein transmitting data at the calibrated transmit power comprises transmitting data at the calibrated transmit power based on the received signal on at least one other symbol following the mapped uplink symbol, the one other symbol contained within an immediate subsequent subframe from the mapped uplink symbol.

5. The method according to claim 1, wherein mapping comprises mapping a power control calibration region to an uplink symbol in a subframe using predetermined criteria, the power control calibration region having a bandwidth less than a frequency allocation in the signal.

6. The method according to claim 1, wherein a frequency domain location of the mapped power control calibration region falls within a common frequency resource allocation bandwidth.

7. The method according to claim 1, wherein the signal from the base station includes at least one of system broadcast information and the uplink scheduling grant.

8. The method according to claim 1, wherein data transmitted includes one selected from the set of a user data transmission, a demodulation reference symbol transmission, and a sounding reference symbol transmission.

9. The method according to claim 1, wherein transmitting data at the calibrated transmit power comprises transmitting data at the calibrated transmit power on at least one other symbol immediately following the mapped uplink symbol.

10. The method according to claim 1, wherein the predetermined criteria is responsive to the signal from the base station and has a variable location.

11. The method according to claim 1, wherein the predetermined criteria includes the signal from the base station, the signal from the base station including at least one of system broadcast information and an uplink scheduling grant.

12. The method according to claim 1, wherein the predetermined criteria includes a predetermined time frequency calibration region with a bandwidth smaller than an allowed occupied bandwidth of the carrier.

13. An apparatus comprising:
    a transceiver configured to transmit and receive data in a frequency division multiplexed wireless system, wherein the transceiver is further configured to receive a signal from a base station;
    a controller coupled to the transceiver, the controller configured to control the operations of the apparatus;
    a power calibration region mapping module configured to map a power control calibration region to an uplink symbol in a subframe to establish a mapped uplink symbol based on predetermined criteria corresponding to the signal; and
    a transmit power calibration module configured to calibrate a transmit power based on transmission in the calibration region, wherein the transceiver is configured to transmit data at the calibrated transmit power on at least one other symbol following the mapped uplink symbol.

14. The apparatus according to claim 13, wherein a frequency domain location of the mapped power control calibration region falls within a scheduled frequency resource allocation bandwidth for the user equipment.

15. The apparatus according to claim 13, wherein the transceiver is configured to transmit data at the calibrated transmit power on at least one other symbol following the mapped uplink symbol, the one other symbol contained within a same subframe as the mapped uplink symbol.

16. The apparatus according to claim 13, wherein the transceiver is configured to transmit data at the calibrated transmit power based on the received signal on at least one other symbol following the mapped uplink symbol, the one other symbol contained within an immediate subsequent subframe from the mapped uplink symbol.

17. The apparatus according to claim 13, wherein the power calibration mapping module is configured to map a power control calibration region to an uplink symbol in a subframe using predetermined criteria corresponding to the signal, the power control calibration region having a bandwidth less than a frequency allocation in the signal.

18. The apparatus according to claim 13, wherein a frequency domain location of the mapped power control calibration region falls within a common frequency resource allocation bandwidth.

19. The apparatus according to claim 13, wherein the transceiver is configured to transmit data at the calibrated transmit power by transmitting data at the calibrated transmit power on at least one other symbol immediately following the mapped uplink symbol.

20. A method comprising:
receiving an uplink scheduling grant at a user equipment from a base station in a frequency division multiplexed wireless system, the frequency division multiplexed wireless system using subframes comprising a plurality of symbols where multiple users transmit in a single subframe at different frequencies;
mapping a power control calibration region to an uplink symbol in a subframe based on a signal from a base station corresponding to the uplink scheduling grant to allocate a mapped uplink symbol for power control calibration;
performing a calibration transmission of a power calibration waveform during the mapped uplink symbol at an initial transmit power;
calibrating a transmit power based on the calibration transmission to generate a calibrated transmit power that is closer to a desired transmission power level from the initial transmit power;
adjusting a transmission power level based on the calibrated transmit power; and
transmitting data at the calibrated transmit power on at least one other symbol immediately following the mapped uplink symbol.

* * * * *